US008526338B2

United States Patent
Pan et al.

(10) Patent No.: US 8,526,338 B2
(45) Date of Patent: Sep. 3, 2013

(54) METHOD, SYSTEM, AND APPARATUS FOR DETERMINING UPLINK TRANSMISSION POWER IN TIME DIVISION DUPLEX SYSTEM

(75) Inventors: Xueming Pan, Beijing (CN); Shiqiang Suo, Beijing (CN); Guojun Xiao, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 352 days.

(21) Appl. No.: 12/989,141

(22) PCT Filed: Apr. 27, 2009

(86) PCT No.: PCT/CN2009/000444
§ 371 (c)(1),
(2), (4) Date: Dec. 8, 2010

(87) PCT Pub. No.: WO2009/129698
PCT Pub. Date: Oct. 29, 2009

(65) Prior Publication Data
US 2011/0267994 A1 Nov. 3, 2011

(30) Foreign Application Priority Data
Apr. 25, 2008 (CN) .......................... 2008 1 0105017

(51) Int. Cl.
*H04J 3/00* (2006.01)
(52) U.S. Cl.
USPC ........... 370/280; 370/310; 370/328; 370/329; 370/337
(58) Field of Classification Search
USPC ................................................ 370/310–350
See application file for complete search history.

(56) References Cited

U.S. PATENT DOCUMENTS

2005/0018656 A1  1/2005  Rudolf et al.
(Continued)

FOREIGN PATENT DOCUMENTS

CN    1 423 500    6/2003
CN    1 802 860    7/2006
(Continued)

*Primary Examiner* — Charles C Jiang
(74) *Attorney, Agent, or Firm* — Fay Kaplun & Marcin, LLP (57) ABSTRACT

A method for determining uplink transmission power in time division duplex system is disclosed: a base station determines the current distribution manner of uplink and downlink sub-frames, acquires the frame correspondence information that corresponds to the distribution manner of said uplink and downlink sub-frames, selects, based on said frame correspondence information, downlink sub-frames to transmit to a terminal the power control (TPC) commands that correspond to the uplink sub-frames. Before using the uplink sub-frames to transmit data, the terminal determines the current distribution manner of uplink and downlink sub-frames, acquires the frame correspondence information that corresponds to the distribution manner of said uplink and downlink sub-frames, determines, based on the frame correspondence information, the downlink sub-frames that are used for transmitting the TPC commands; acquires the TPC commands received by the downlink sub-frames, and determines the data transmission power of the uplink sub-frames based on said TPC commands. The present invention also discloses a time division duplex data transmission system and an apparatus therefor. With the present invention, a time division duplex system can transmit and receive TPC commands based on the frame correspondence information, thereby enabling correct and effective uplink power control performance.

9 Claims, 4 Drawing Sheets

(56) References Cited

U.S. PATENT DOCUMENTS

| | | |
|---|---|---|
| 2005/0143121 A1 | 6/2005 | Huh et al. |
| 2008/0227461 A1* | 9/2008 | Dayal et al. ............... 455/452.2 |
| 2009/0117931 A1* | 5/2009 | Shin et al. ................... 455/522 |
| 2010/0027446 A1* | 2/2010 | Choi et al. ................... 370/280 |

FOREIGN PATENT DOCUMENTS

| | | |
|---|---|---|
| CN | 1 898 886 | 1/2007 |
| EP | 0 986 192 | 3/2000 |
| EP | 1 852 983 | 11/2007 |
| WO | 2004/088899 | 10/2004 |

\* cited by examiner

| Uplink and downlink sub-frame allocation mode | Switch point periodicity | Sub-frame identifier | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Configuration 0

| | | | | | | | | | | | | | | | | | | | | |
|---|---|---|---|---|---|---|---|---|---|---|---|---|---|---|---|---|---|---|---|---|
| | D | S | U | U | U | D | S | U | U | U | D | S | U | U | U | D | S | U | U | U |
| Sub-frame identifier | 0 | 1 | 2 | 3 | 4 | 5 | 6 | 7 | 8 | 9 | 0 | 1 | 2 | 3 | 4 | 5 | 6 | 7 | 8 | 9 |
| TPC location | T47 | T78 | | | | T92 | T23 | | | | T47 | T78 | | | | T92 | T23 | | | |

Configuration 1

| | | | | | | | | | | |
|---|---|---|---|---|---|---|---|---|---|---|
| | D | D | S | U | U | D | D | S | U | U |
| Sub-frame identifier | 9 | 0 | 1 | 2 | 3 | 4 | 5 | 6 | 7 | 8 ... |
| TPC location | T3 | T7 | | | | T8 | T2 | | | ... |

Configuration 2

| | | | | | | | | | | | | | |
|---|---|---|---|---|---|---|---|---|---|---|---|---|---|
| | U | D | D | D | S | U | D | D | D | S | U | D | D | D | S |
| Sub-frame identifier | 7 | 8 | 9 | 0 | 1 | 2 | 3 | 4 | 5 | 6 | 7 | 8 | 9 | 0 | 1 ... |
| TPC location | T2 | | | | | T7 | | | | | T2 | | | | ... |

Configuration 3

| | | | | | | | | | | | | | | |
|---|---|---|---|---|---|---|---|---|---|---|---|---|---|---|---|
| | D | D | D | S | U | U | U | D | D | D | D | D | S | U | U | U |
| Sub-frame identifier | 8 | 9 | 0 | 1 | 2 | 3 | 4 | 5 | 6 | 7 | 8 | 9 | 0 | 1 | 2 | 3 4 ... |
| TPC location | T2 | T3 | T4 | | | | | | | | T2 | T3 | T4 | | | ... |

Configuration 4

| | | | | | | | | | | | | | | |
|---|---|---|---|---|---|---|---|---|---|---|---|---|---|---|---|
| | D | D | D | S | U | U | D | D | D | D | D | D | S | U | U | D |
| Sub-frame identifier | 8 | 9 | 0 | 1 | 2 | 3 | 4 | 5 | 6 | 7 | 8 | 9 | 0 | 1 | 2 | 3 ... |
| TPC location | T2 | T3 | | | | | | | | | T2 | T3 | | | | ... |

Configuration 5

| | | | | | | | | | | | | | | |
|---|---|---|---|---|---|---|---|---|---|---|---|---|---|---|---|
| | D | D | D | S | U | D | D | D | D | D | D | D | S | U | D | D |
| Sub-frame identifier | 8 | 9 | 0 | 1 | 2 | 3 | 4 | 5 | 6 | 7 | 8 | 9 | 0 | 1 | 2 | ... |
| TPC location | T2 | | | | | | | | | | T2 | | | | | ... |

Configuration 6

| | | | | | | | | | | | | | | | | | | | |
|---|---|---|---|---|---|---|---|---|---|---|---|---|---|---|---|---|---|---|---|
| | U | U | U | D | S | U | U | D | D | S | U | U | U | D | S | U | U | D | D | S U U U |
| Sub-frame identifier | 2 | 3 | 4 | 5 | 6 | 7 | 8 | 9 | 0 | 1 | 2 | 3 | 4 | 5 | 6 | 7 | 8 | 9 | 0 | 1 2 3 4 |
| TPC location | | | T2 | T3 | | | | T4 | T7 | T8 | | | T2 | T3 | | | | T4 | T7 | T8 |

Fig. 2B

| Uplink and downlink sub-frame allocation mode | Uplink sub-frame identifier | | | | | | | | | |
|---|---|---|---|---|---|---|---|---|---|---|
| | 0 | 1 | 2 | 3 | 4 | 5 | 6 | 7 | 8 | 9 |
| 0 | | | 6/7 | 7 | 4 | | | 6/7 | 7 | 4 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

METHOD, SYSTEM, AND APPARATUS FOR DETERMINING UPLINK TRANSMISSION POWER IN TIME DIVISION DUPLEX SYSTEM

CROSS REFERENCE TO RELATED APPLICATIONS

The present application is a US National Stage of International Application No. PCT/CN2009/000444, filed 27 Apr. 2009, designating the United States, and claiming priority to Chinese Patent Application No. 200810105017.8 filed 25 Apr. 2008.

FIELD OF THE INVENTION

The present invention relates to the field of wireless transmission, and particularly to a method, system and apparatus for determining uplink transmission power in a Time Division Duplex (TDD) system.

BACKGROUND OF THE INVENTION

In a Long Term Evolution (LTE) system, the uplink power is controlled with the combination of an open-loop mode and a closed-loop mode. In the open-loop mode, the transmission power is adjusted by a User Equipment (UE) based on the uplink resource allocation, a transmission format, a path loss and some parameters broadcasted by a base station, while in the closed-loop mode, the uplink transmission power of the UE is adjusted by a Transmission Power Control (TPC) command sent by the base station to the UE.

The transmission power in the Physical Uplink Share Channel (PUSCH) of the UE depends on the base station, while the calculation of the transmission power is completed by the UE. The base station informs the UE about parameters necessary for the PUSCH power control at the UE through a broadcast message and Radio Resource Control signaling, and adjusts the uplink transmission power of the UE through a downlink control channel in real time; while the UE calculates the current PUSCH transmission power according to formulas prescribed in the standards and applies the power adjustment.

The transmission power $P_{PUSCH}$ for the UE to transmit data at an uplink sub-frame i over the PUSCH is represented by the formula below:

$$P_{PUSCH}(i)=\min\{P_{MAX}, 10\log_{10}(M_{PUSCH}(i))+P_{O\_PUSCH}(j)+\alpha \cdot PL+\Delta_{TF}(TF(i))+f(i)\}[\text{dBm}],$$

where,

1. $P_{MAX}$ denotes the maximum permitted transmission power depends on the level of the UE;
2. $M_{PUSCH}(i)$ denotes the size of resources allocated for the PUSCH that are enabled at the ith uplink sub-frame, and is represented in the number of Resource Blocks (RBs);
3. $P_{O\_PUSCH}(j)$ denotes an initial value of PUSCH power, and is composed of a cell dedicated normalized portion $P_{O\_NOMINAL\_PUSCH}(j)$ of 8 bits plus a UE dedicated portion $P_{O\_UE\_PUSCH}(j)$ of 4 bits. Here, $P_{O\_NOMINAL\_PUSCH}(j)$ (with j=0 and 1) is informed by a higher layer, with a dynamic range of [−126, 24] dBm and a granularity of 1 dB; while $P_{O\_UE\_PUSCH}(j)$ (with j=0 and 1) is configured by the RRC, with a dynamic range of [−8, 7] dB and a granularity of 1 dB. If the PUSCH transmission/retransmission corresponds to already configured schedule permission, j=0; and if the PUSCH transmission/retransmission corresponds to a Physical Downlink Control Channel (PDCCH) with the received Downlink Control Information (DCI) format being 0, which contains schedule permission transmitted by a new packet, then j=1;
4. $\alpha \in \{0, 0.4, 0.5, 0.6, 0.7, 0.8, 0.9, 1\}$, which is a cell dedicated parameter, denotes a compensation factor for path loss and is indicated with 3 bits by higher layer signaling;
5. PL denotes a downlink path loss measured by the UE;
6. if $K_s=1.25$, $\Delta_{TF}(TF(i))=10\log_{10}(2^{MPR \cdot K_s}-1)$; if $K_s=0$, $\Delta_{TF}(TF(i))=0$; where $K_s$ is a cell dedicated parameter and is indicated by RRC signaling; TF(i) denotes a PUSCH transmission format enabled at the ith sub-frame MPR=modulation×codingrate=$N_{INFO}/N_{RE}$, where $N_{INFO}$ denotes the number of information bits, and $N_{RE}$ denotes the number of resource elements determined by a transmission format TF(i) of the ith sub-frame and a resource allocation size $M_{PUSCH}(i)$;
7. the current PUSCH power control adjustment state is denoted by f(i), which is defined as $f(i)=f(i-1)+\delta_{PUSCH}(i-K_{PUSCH})$ in the case of an accumulated adjustment mode, and $f(i)=\delta_{PUSCH}(i-K_{PUSCH})$ in the case of an absolute adjustment mode;

where, in the case of $f(i)=f(i-1)+\delta_{PUSCH}(i-K_{PUSCH})$, then (1) $f(0)=0$, $K_{PUSCH}=4$;

(2) $\delta_{PUSCH}$ denotes an accumulated correction value and is obtained through decoding from a TPC command received at the $(i-K_{PUSCH})$th sub-frame which is ahead of the ith sub-frame by a number $K_{PUSCH}$ of sub-frames, for example, if i=10, $\delta_{PUSCH}$ is obtained through decoding from the TPC command received at the 6th sub-frame;

(3) when the TPC command cannot be obtained through decoding or the UE is in a DRX state, a $\delta_{PUSCH}=0$ dB;

(4) the accumulated correction value $\delta_{PUSCH}$ may be of a value selected from a set of [−1, 0, 1, 3] when it is indicated by PUSCH having a DCI format of 0;

(5) the accumulated correction value $\delta_{PUSCH}$ may be of a value selected from a set of [−1, 1] or [−1, 0, 1, 3] when it is indicated by PUSCH having a DCI format of 3/3A, and whether [−1, 1] or [−1, 0, 1, 3] is selected is semi-statically configured at the higher layer;

(6) if the maximum transmission power of the UE is reached, any "positive" TPC command is not accumulated;

(7) if the minimum transmission power of the UE is reached, any "negative" TPC command is not accumulated; and (8) the accumulation of TPC commands needs reconfiguration for the UE in any of states selected from a) when a cell of the UE is updated, b) when the UE enters/quits an RRC activated state, c) when a TPC command in the absolute adjustment mode is received, d) when $P_{O\_UE\_PUSCH}(j)$ notified by the RRC is received, and e) when the UE is in a synchronizing/re-synchronizing state;

where in the case of $f(i)=\delta_{PUSCH}(i-K_{PUSCH})$, then (1) $\delta_{PUSCH}$ denotes an absolute correction value and is obtained through decoding from a TPC command received at the $(i-K_{PUSCH})$th sub-frame which is ahead of the ith sub-frame by a number $K_{PUSCH}$ of sub-frames;

(2) $K_{PUSCH}=4$;

(3) the absolute correction value $\delta_{PUSCH}$ may be of a value selected from a set of [−4, −1, 1, 4] when it is indicated by PDCCH having a DCI format of 0; and (4) when the TPC command cannot be obtained through decoding or the UE is in a DRX state, f(i)=f(i−1).

The UE selects the accumulated adjustment mode or the absolute adjustment mode according to the RRC instruction.

The $K_{PUSCH}$ is a delay of TPC controlling for PUSCH, and the TPC used for transmitting uplink data at the ith sub-frame is actually transmitted via control signaling at the $(i-K_{PUSCH})$ sub-frame by the base station. Typically, in a Frequency Division Duplex (FDD) system, the delay caused by the processing of the downlink control signaling by the UE is no more than 3 ms, and thus $K_{PUSCH}=4$.

Figure 1:
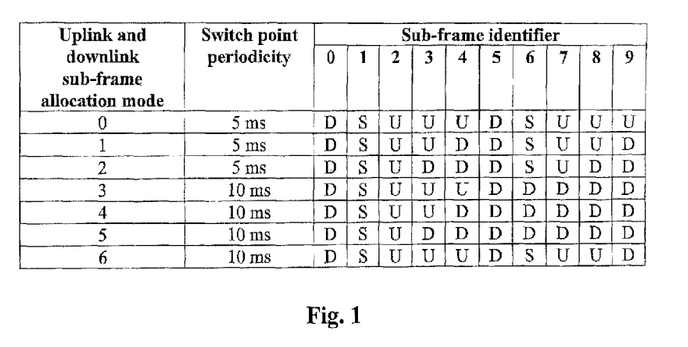
FIG. 1 is a schematic diagram showing uplink and downlink sub-frame allocation modes in an LTE TDD system in the prior art.

In a TDD system, however, the delay of TPC controlling cannot be set as a predefined value due to the presence of a plurality of uplink and downlink sub-frame allocation modes (as shown in FIG. 1) and the case of multiple frame schedule where a plurality of uplink sub-frames are scheduled by each schedule signaling command; in addition, there is no available method for determining the delay of TPC controlling in the TDD system at present, and the mapping between an uplink sub-frame and the downlink sub-frame transmitting the TPC command cannot be established, such that the UE cannot determine the downlink sub-frame from which the TPC command can be obtained when the UE attempts to control the power used for transmitting data via a certain uplink sub-frame, and thus cannot determine the transmission power according to the parameter $\delta_{PUSCH}$ in the TPC command. That is, the uplink power control cannot be achieved properly and effectively in the TDD system.

FIG. 1 shows seven uplink and downlink sub-frame allocation modes 0-6 in the existing TDD system.

The uplink and downlink sub-frame allocation modes 0-2 each have a switch point periodicity of 5 ms. In the mode 0, each half-frame is composed of 1 downlink sub-frame (D), 1 special sub-frame (S) and 3 uplink sub-frames (U); in the mode 1, each half-frame is composed of 2 downlink sub-frames, 1 special sub-frame and 2 uplink sub-frames; and in the mode 2, each half-frame is composed of 3 downlink sub-frames, 1 special sub-frame and 1 uplink sub-frame.

The uplink and downlink sub-frame allocation modes 3-6 each have a switch point periodicity of 10 ms. In the mode 3, each half-frame is composed of 6 downlink sub-frames (D), 1 special sub-frame (S) and 3 uplink sub-frames (U); in the mode 4, each half-frame is composed of 7 downlink sub-frames, 1 special sub-frame and 2 uplink sub-frames; in the mode 5, each half-frame is composed of 8 downlink sub-frames, 1 special sub-frame and 1 uplink sub-frame; and in the mode 6, each half-frame is composed of 3 downlink sub-frames, 2 special sub-frames and 5 uplink sub-frames.

The special sub-frame includes a downlink special timeslot (i.e. Downlink Pilot Timeslot, DwPTS), a switch point timeslot (i.e. Guard Period) and an uplink special timeslot.

SUMMARY OF THE INVENTION

Embodiments of the present invention provide a method, system and apparatus for determining uplink transmission power in a TDD system, to eliminate the disadvantage that uplink power control cannot be achieved properly and effectively in the existing TDD system.

An embodiment of the invention provides a method for determining uplink transmission power in a Time Division Duplex system, including:

determining, by a base station, a current uplink and downlink sub-frame allocation mode, obtaining a sub-frame mapping corresponding to the uplink and downlink sub-frame allocation mode, selecting a downlink sub-frame according to the sub-frame mapping to transmit to a User Equipment a Transmission Power Control, TPC, command corresponding to an uplink sub-frame; and determining, by the User Equipment, the current uplink and downlink sub-frame allocation mode before transmitting data using the uplink sub-frame, obtaining the sub-frame mapping corresponding to the uplink and downlink sub-frame allocation mode, determining the downlink sub-frame used for transmitting the TPC command corresponding to the uplink sub-frame according to the sub-frame mapping, obtaining the TPC command received through the determined downlink sub-frame, and determining power for data transmission via the uplink sub-frame according to the TPC command.

An embodiment of the invention provides a Time Division Duplex data transmission system, including:

a base station configured to determine a current uplink and downlink sub-frame allocation mode and obtain a sub-frame mapping corresponding to the uplink and downlink sub-frame allocation mode, and select a downlink sub-frame according to the sub-frame mapping to transmit to a User Equipment a Transmission Power Control, TPC, command corresponding to an uplink sub-frame; and a User Equipment configured to determine the current uplink and downlink sub-frame allocation mode before transmitting data using the uplink sub-frame, obtain the sub-frame mapping corresponding to the uplink and downlink sub-frame allocation mode, determine the downlink sub-frame used for transmitting the TPC command corresponding to the uplink sub-frame according to the sub-frame mapping, obtain the TPC command received through the determined downlink sub-frame, and determine the power for data transmission via the uplink sub-frame according to the TPC command.

An embodiment of the invention provides a base station including:

a structure unit configured to determine a current uplink and downlink sub-frame allocation mode, and obtain a sub-frame mapping corresponding to the uplink and downlink sub-frame allocation mode;

a selection unit configured to select, according to the sub-frame mapping, a downlink sub-frame to be used for transmitting a Transmission Power Control command to a User Equipment; and a transmission unit configured to transmit the Transmission Power Control command to the User Equipment via the selected downlink sub-frame.

An embodiment of the invention provides a User Equipment including:

an information unit configured to determine a current uplink and downlink sub-frame allocation mode before transmitting data using an uplink sub-frame, and obtain a sub-frame mapping corresponding to the uplink and downlink sub-frame allocation mode;

a sub-frame unit configured to determine a downlink sub-frame used for transmitting the Transmission Power Control command corresponding to the uplink sub-frame according to the sub-frame mapping;

an instruction unit configured to obtain the Transmission Power Control command received through the determined downlink sub-frame; and a power unit configured to determine the power for data transmission via the uplink sub-frame according to the Transmission Power Control command.

In the embodiments of the present invention, the base station selects a downlink sub-frame for transmitting the TPC command according to the configured sub-frame mapping, and the UE obtains the TPC command received through the corresponding downlink sub-frame according to the configured sub-frame mapping and determines the transmission power according to the TPC command. As a result, the TPC command can be transmitted and received according to the sub-frame mapping in the TDD system, thus enabling proper and effective uplink power control.

DETAILED DESCRIPTION OF THE EMBODIMENTS

To enable a proper and effective uplink power control in a TDD system, an embodiment of the invention provides a method for determining uplink transmission power in a TDD system, in which a base station selects, according to configuration information, a downlink sub-frame for transmitting a TPC command, a User Equipment obtains the TPC command received through the downlink sub-frame according to the configuration information, and determines transmission power according to the TPC command.

Figure 2A:
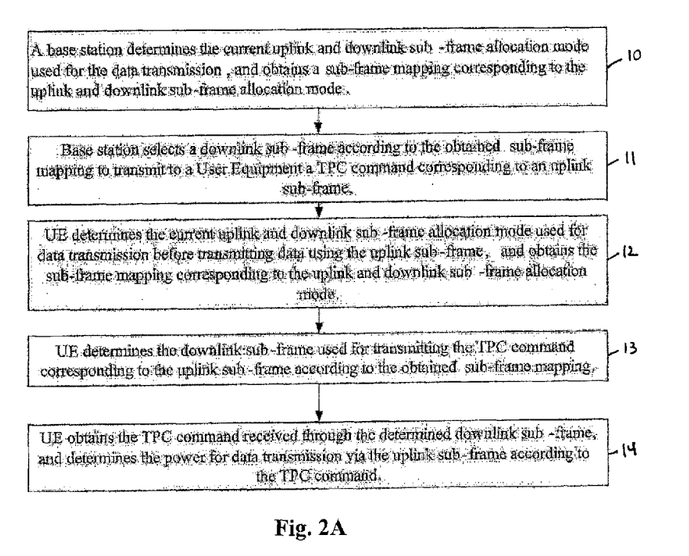
FIG. 2A is a schematic diagram showing the flow of a method according to an embodiment of the invention.

As shown in FIG. 2A, the method for determining the uplink transmission power in the TDD system according to an embodiment of the invention includes the following processes 10-14.

At process 10, a base station determines the current uplink and downlink sub-frame allocation mode used for the data transmission, and obtains a sub-frame mapping corresponding to the uplink and downlink sub-frame allocation mode.

The uplink and downlink sub-frame allocation modes used for the data transmission include but are not limited to the seven uplink and downlink sub-frame allocation modes as shown in FIG. 1, and each uplink and downlink sub-frame allocation mode corresponds to a set of sub-frame mappings. The sub-frame mapping may be obtained from the local configuration information or from other storage entities.

At process 11, the base station selects a downlink sub-frame according to the obtained sub-frame mapping to transmit to a User Equipment a TPC command corresponding to an uplink sub-frame.

The sub-frame mapping may be, for example, a mapping relationship between an identifier of the uplink sub-frame and an identifier of the downlink sub-frame, or a mapping In the case that the sub-frame mapping is the mapping relationship between an identifier of the uplink sub-frame and an identifier of the downlink sub-frame, the process in which the base station selects a downlink sub-frame according to the sub-frame mapping to transmit to the User Equipment the TPC command corresponding to an uplink sub-frame includes: obtaining an identifier of the uplink sub-frame, determining a downlink sub-frame identifier corresponding to the identifier of the uplink sub-frame according to the mapping relationship, determining a downlink sub-frame corresponding to the downlink sub-frame identifier ahead of the uplink sub-frame as the sub-frame used for transmitting the TPC command to the UE, and transmitting the TPC command to the UE through the sub-frame used for transmitting the TPC command.

In the case that the sub-frame mapping is a mapping relationship between the identifier of the uplink sub-frame and a value of a delay of TPC controlling, the process in which the base station selects a downlink sub-frame according to the sub-frame mapping to transmit to the User Equipment the TPC command corresponding to an uplink sub-frame includes: obtaining an identifier of the uplink sub-frame, determining a value of the delay of TPC controlling corresponding to the identifier of the uplink sub-frame according to the mapping relationship, determining a downlink sub-frame ahead of the uplink sub-frame by a time interval of a size of the determined value of the delay of TPC controlling as the sub-frame used for transmitting the TPC command to the UE, and transmitting the TPC command to the UE through the sub-frame used for transmitting the TPC command.

At process 12, the UE determines the current uplink and downlink sub-frame allocation mode used for data transmission before transmitting data using the uplink sub-frame, and obtains the sub-frame mapping corresponding to the uplink and downlink sub-frame allocation mode.

The uplink and downlink sub-frame allocation modes used for the data transmission include but are not limited to the seven uplink and downlink sub-frame allocation modes as shown in FIG. 1, and each uplink and downlink sub-frame allocation mode corresponds to a set of sub-frame mappings.

At process 13, the UE determines the downlink sub-frame used for transmitting the TPC command corresponding to the uplink sub-frame according to the obtained sub-frame mapping.

Similarly, the sub-frame mapping may be, for example, a mapping relationship between an identifier of the uplink sub-frame and an identifier of the downlink sub-frame, or a mapping relationship between the identifier of the uplink sub-frame and a value of a delay of TPC controlling.

In the case that the sub-frame mapping is the mapping relationship between an identifier of the uplink sub-frame and an identifier of the downlink sub-frame, the process in which the UE determines the downlink sub-frame used for transmitting the TPC command includes: obtaining an identifier of the uplink sub-frame, determining a downlink sub-frame identifier corresponding to the identifier of the uplink sub-frame according to the mapping relationship, and determining a downlink sub-frame corresponding to the downlink sub-frame identifier ahead of the uplink sub-frame as the sub-frame used for transmitting the TPC command.

In the case that the sub-frame mapping is a mapping relationship between the identifier of the uplink sub-frame and a value of a delay of TPC controlling, the process in which the UE determines the downlink sub-frame used for transmitting the TPC command includes: obtaining an identifier of the uplink sub-frame, determining a value of the delay of TPC controlling corresponding to the identifier of the uplink sub-frame according to the mapping relationship, and determining a downlink sub-frame ahead of the uplink sub-frame by a time interval of a size of the determined value of the delay of TPC controlling as the sub-frame used for transmitting the TPC command.

At process 14, the UE obtains the TPC command received through the determined downlink sub-frame, and determines the power for data transmission via the uplink sub-frame according to the TPC command.

For example, the power for data transmission via the current uplink sub-frame may be determined as follows.

The UE decodes the TPC command received through the downlink sub-frame, to obtain an adjustment correction value $\delta_{PUSCH}$.

Subsequently, the value of the current PUSCH power control adjustment state f(i) is determined using the accumulated adjustment mode or the absolute adjustment mode.

That is, $f(i)=f(i-1)+\delta_{PUSCH}(i-K_{PUSCH})$ is applicable to the case of the accumulated adjustment mode, where $f(0)=0$, $\delta_{PUSCH}(i-K_{PUSCH})$ denotes the value $\delta_{PUSCH}$ received through the $(i-K_{PUSCH})$th sub-frame which is ahead of the current ith uplink sub-frame by a number $K_{PUSCH}$ of sub-frames. The value of $\delta_{PUSCH}(i-K_{PUSCH})$ is equal to the value $\delta_{PUSCH}$ obtained from the above decoding.

On the other hand, $f(i)=\delta_{PUSCH}(i-K_{PUSCH})$ is applicable to the case of the absolute adjustment mode, where $\delta_{PUSCH}(i-K_{PUSCH})$ denotes the value $\delta_{PUSCH}$ received through the $(i-K_{PUSCH})$th sub-frame which is ahead of the current ith uplink sub-frame by a number $K_{PUSCH}$ of sub-frames. The value of $\delta_{PUSCH}(i-K_{PUSCH})$ is equal to the value $\delta_{PUSCH}$ obtained from the above decoding.

Finally, the power for data transmission via the current uplink sub-frame is determined by the below existing formula:

$$P_{PUSCH}(i)=\min\{P_{MAX}, 10\log_{10}(M_{PUSCH}(i))+P_{O\_PUSCH}(j)+\alpha \cdot PL+\Delta_{TF}(TF(i))+f(i)\}.$$

The sub-frame mapping configured in the present invention needs to satisfy the requirement of the delay caused by the processing of the downlink control signaling by the UE, thus, in the case that the sub-frame mapping refers to the mapping relationship between an identifier of the uplink sub-frame and an identifier of the downlink sub-frame, the time interval between the uplink sub-frame and the corresponding downlink sub-frame within each mapping relationship needs to be more than or equal to the delay caused by the processing of the downlink control signaling by the UE. For example, if the delay caused by the processing of the downlink control signaling by the UE is within 3 ms, the time interval between the uplink sub-frame and the corresponding downlink sub-frame within each mapping relationship needs to be more than or equal to 3 ms, further, considering that a sub-frame has a length of 1 ms at present, the uplink sub-frame and the corresponding downlink sub-frame within each mapping relationship are separated from each other by at least 4 sub-frames.

Likewise, in the case that the sub-frame mapping is the mapping relationship between the identifier of the uplink sub-frame and a value of the delay of TPC controlling, the time interval between the downlink sub-frame determined according to the value of the delay of TPC controlling in the mapping relationship and the uplink sub-frame in the mapping relationship needs to be more than or equal to the delay caused by the processing of the downlink control signaling by the UE.

The sub-frame mapping configured in the present invention is applicable to both a single frame schedule and the multiple frame schedule. The single frame schedule refers to the case where a control signaling command in one downlink sub-frame is used for scheduling one uplink sub-frame subsequent to the downlink sub-frame; while the multiple frame schedule refers to the case where a control signaling command in one downlink sub-frame is used for scheduling multiple continuous uplink sub-frames subsequent to the downlink sub-frame, and the power used for the data transmission by all of the multiple uplink sub-frames is determined with the TPC command transmitted through the downlink sub-frame.

Due to the presence of both the single frame schedule and the multiple frame schedule and the fact that the uplink and downlink sub-frames in the TDD system are unsymmetrical, the mapping relationship between the identifier of the uplink sub-frame and the identifier of the downlink sub-frame may be one or more from a group consisting of a one-to-one mapping relationship, a one-to-multiple mapping relationship and a multiple-to-one mapping relationship; and the mapping relationship between the identifier of the uplink sub-frame and a value of the delay of TPC controlling includes a one-to-one mapping relationship and/or a one-to-multiple mapping relationship.

The method of the embodiment of the invention is described below with reference to a specific implementation.

In the implementation, for example, the delay caused by the processing of the downlink control signaling by the UE is 3 ms, each sub-frame has a length of 1 ms. In the case of the uplink and downlink sub-frame allocation mode 0, the multiple frame schedule is employed, and the sub-frame mapping is configured in such a way that a TPC command in one downlink sub-frame is used for scheduling the first two continuous uplink sub-frames subsequent to the one downlink sub-frame with a delay of 3 sub-frames. In the case of uplink and downlink sub-frame allocation modes 1-6, the single frame schedule is employed, and the sub-frame mapping is configured in such a way that a TPC command in one downlink sub-frame is used for scheduling the first uplink sub-frame subsequent to the one downlink sub-frame with a delay of 3 sub-frames and the TPC command is distributed uniformly. The allocation of uplink and downlink sub-frames in the uplink and downlink sub-frame allocation modes 0-6 is shown in FIG. 1.

Figure 2B:
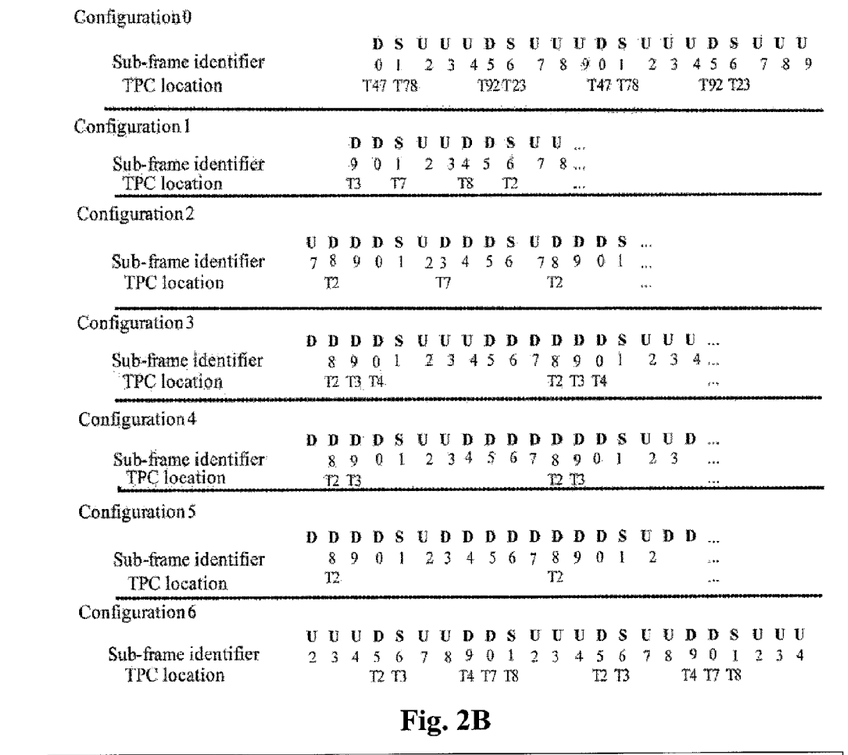
FIG. 2B is a schematic diagram showing the configuration of a sub-frame mapping according to an embodiment of the invention.

With reference to FIG. 2B, a schematic diagram of the sub-frame mapping represented as a mapping relationship between the uplink sub-frame identifier and the downlink sub-frame identifier is shown, where a location Tx indicates that a TPC command used for determining the data transmission power of the xth uplink sub-frame is transmitted over the downlink sub-frame indexed with the location Tx, and a location Txy indicates that a TPC command used for determining the data transmission power of the continuous two uplink sub-frames x and y is transmitted over the downlink sub-frame indexed with the location Txy.

For example, in the case of uplink and downlink sub-frame allocation mode 0, the uplink sub-frame 2 corresponds to the downlink sub-frame 5 or the special sub-frame 6, the uplink sub-frame 3 corresponds to the special sub-frame 6, the uplink sub-frame 4 corresponds to the downlink sub-frame 0, the uplink sub-frame 7 corresponds to the downlink sub-frame 0 or the special sub-frame 1, the uplink sub-frame 8 corresponds to the special sub-frame 1, and the uplink sub-frame 9 corresponds to the downlink sub-frame 5.

In the case of uplink and downlink sub-frame allocation mode 1, the uplink sub-frame 2 corresponds to the special sub-frame 6, the uplink sub-frame 3 corresponds to the downlink sub-frame 9, the uplink sub-frame 7 corresponds to the special sub-frame 1, and the uplink sub-frame 8 corresponds to the downlink sub-frame 4.

In the case of uplink and downlink sub-frame allocation mode 2, the uplink sub-frame 2 corresponds to the downlink sub-frame 8, and the uplink sub-frame 7 corresponds to the downlink sub-frame 3.

In the case of uplink and downlink sub-frame allocation mode 3, the uplink sub-frame 2 corresponds to the downlink sub-frame 8, the uplink sub-frame 3 corresponds to the downlink sub-frame 9, and the uplink sub-frame 4 corresponds to the downlink sub-frame 0.

In the case of uplink and downlink sub-frame allocation mode 4, the uplink sub-frame 2 corresponds to the downlink sub-frame 8, and the uplink sub-frame 3 corresponds to the downlink sub-frame 9.

In the case of uplink and downlink sub-frame allocation mode 5, the uplink sub-frame 2 corresponds to the downlink sub-frame 8.

In the case of uplink and downlink sub-frame allocation mode 6, the uplink sub-frame 2 corresponds to the downlink sub-frame 5, the uplink sub-frame 3 corresponds to the special sub-frame 6, the uplink sub-frame 4 corresponds to the downlink sub-frame 9, the uplink sub-frame 7 corresponds to the downlink sub-frame 0, and the uplink sub-frame 8 corresponds to the special sub-frame 1.

For example, when the uplink and downlink sub-frame allocation mode 0 is employed, the UE determines, before transmitting data via the current uplink sub-frame 7, that the uplink sub-frame 7 corresponds to the downlink sub-frame 0 and the special sub-frame 1 according to the provided mapping relationship between the uplink sub-frame identifier and the downlink sub-frame identifier, and then attempts to obtain a TPC command received through the downlink sub-frame 0 or the special sub-frame 1 and determines the power for the data transmission via the uplink sub-frame 7 according to the obtained TPC command.

Figure 2C:
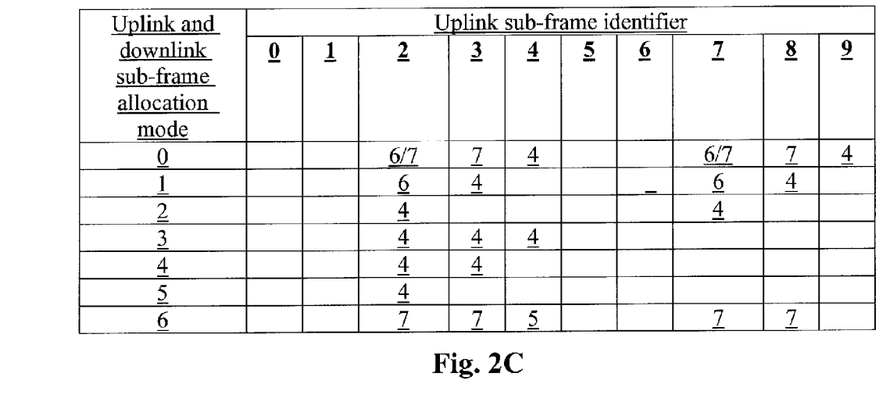
FIG. 2C is a schematic diagram showing the configuration of the sub-frame mapping according to an embodiment of the invention.

With reference to FIG. 2C, a schematic diagram of the sub-frame mapping represented as a mapping relationship between the uplink sub-frame identifier and a value of the delay of TPC controlling, where x/y means that the delay of TPC controlling $K_{PUSCH}=x$ in the case of the first uplink sub-frame in the multiple frame schedule and the delay of TPC controlling $K_{PUSCH}=y$ in the case of the second uplink sub-frame in the multiple frame schedule.

For example, in the case of uplink and downlink sub-frame allocation mode 0, the value of the delay of TPC controlling corresponding to the uplink sub-frame 2 is 6 or 7, the value of the delay of TPC controlling corresponding to the uplink sub-frame 3 is 7, the value of the delay of TPC controlling corresponding to the uplink sub-frame 4 is 4, the value of the delay of TPC controlling corresponding to the uplink sub-frame 7 is 6 or 7, the value of the delay of TPC controlling corresponding to the uplink sub-frame 8 is 7, and the value of the delay of TPC controlling corresponding to the uplink sub-frame 9 is 4.

In the case of uplink and downlink sub-frame allocation mode 1, the value of the delay of TPC controlling corresponding to the uplink sub-frame 2 is 6, the value of the delay of TPC controlling corresponding to the uplink sub-frame 3 is 4, the value of the delay of TPC controlling corresponding to the uplink sub-frame 7 is 6, and the value of the delay of TPC controlling corresponding to the uplink sub-frame 8 is 4.

In the case of uplink and downlink sub-frame allocation mode 2, the value of the delay of TPC controlling corresponding to the uplink sub-frame 2 is 4, and the value of the delay of TPC controlling corresponding to the uplink sub-frame 7 is 4.

In the case of uplink and downlink sub-frame allocation mode 3, the value of the delay of TPC controlling corresponding to the uplink sub-frame 2 is 4, the value of the delay of TPC controlling corresponding to the uplink sub-frame 3 is 4, and value of the delay of TPC controlling corresponding to the uplink sub-frame 4 is 4.

In the case of uplink and downlink sub-frame allocation mode 4, the value of the delay of TPC controlling corresponding to the uplink sub-frame 2 is 4, and the value of the delay of TPC controlling corresponding to the uplink sub-frame 3 is 4.

In the case of uplink and downlink sub-frame allocation mode 5, the value of the delay of TPC controlling corresponding to the uplink sub-frame 2 is 4.

In the case of uplink and downlink sub-frame allocation mode 6, the value of the delay of TPC controlling corresponding to the uplink sub-frame 2 is 7, the value of the delay of TPC controlling corresponding to the uplink sub-frame 3 is 7, the value of the delay of TPC controlling corresponding to the uplink sub-frame 4 is 5, the value of the delay of TPC controlling corresponding to the uplink sub-frame 7 is 7, and the value of the delay of TPC controlling corresponding to the uplink sub-frame 8 is 7.

For example, when the uplink and downlink sub-frame allocation mode 0 is employed, the UE determines, before transmitting data via the current uplink sub-frame 7, that the uplink sub-frame 7 corresponds to a value of a delay of TPC controlling which is 6 or 7 according to the provided mapping relationship between the uplink sub-frame identifier and the value of the delay of TPC controlling, and then determines that a special sub-frame 1 is ahead of the uplink sub-frame 7 by 6 sub-frames and a downlink sub-frame 0 is ahead of the uplink sub-frame 7 by 7 sub-frames, attempts to obtain a TPC command received through the downlink sub-frame 0 or the special sub-frame 1, and determines the power for the data transmission via the uplink sub-frame 7 according to the obtained TPC command.

Figure 3:
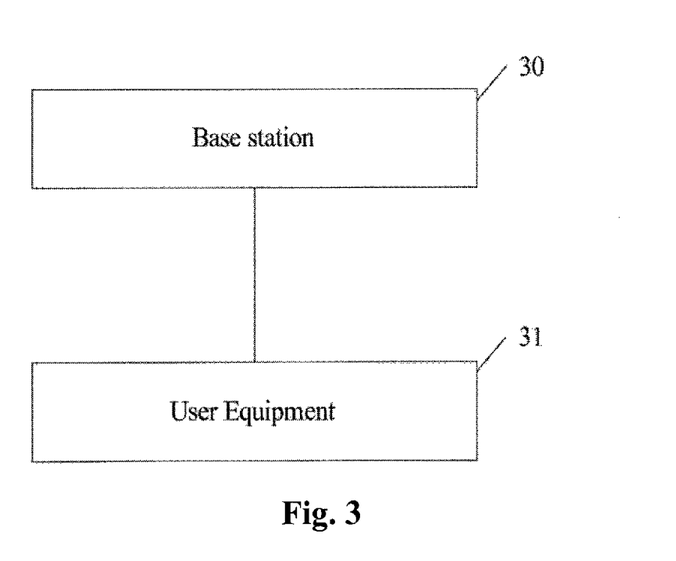
FIG. 3 is a schematic diagram showing the structure of a system according to an embodiment of the invention.

As shown in FIG. 3, an embodiment of the invention further provides a Time Division Duplex data transmission system including a base station 30 and a User Equipment 31.

The base station 30 is configured to determine the current uplink and downlink sub-frame allocation mode used for the data transmission and obtain a sub-frame mapping corresponding to the uplink and downlink sub-frame allocation mode, and select a downlink sub-frame according to the sub-frame mapping to transmit to a User Equipment a TPC command corresponding to an uplink sub-frame.

The User Equipment 31 is configured to determine the current uplink and downlink sub-frame allocation mode used for data transmission before transmitting data using the uplink sub-frame, obtain the sub-frame mapping corresponding to the uplink and downlink sub-frame allocation mode, determine the downlink sub-frame used for transmitting the TPC command corresponding to the uplink sub-frame according to the sub-frame mapping, obtain the TPC command received through the determined downlink sub-frame, and determine the power for data transmission via the uplink sub-frame according to the TPC command.

For example, the base station 30 includes a structure unit, a selection unit and a transmission unit.

The structure unit is configured to determine the current uplink and downlink sub-frame allocation mode used for data transmission, and obtain the sub-frame mapping corresponding to the uplink and downlink sub-frame allocation mode.

The selection unit is configured to select, according to the sub-frame mapping, a downlink sub-frame to be used for transmitting a TPC command to the UE.

The transmission unit is configured to transmit the TPC command to the UE via the selected downlink sub-frame.

In an embodiment, the selection unit includes an identification unit and a first determination unit.

The identification unit is configured to obtain an identifier of the uplink sub-frame when the sub-frame mapping is represented as the mapping relationship between the uplink sub-frame identifier and the downlink sub-frame identifier, and determine a downlink sub-frame identifier corresponding to the identifier of the uplink sub-frame according to the mapping relationship.

The first determination unit is configured to determine a downlink sub-frame corresponding to the determined downlink sub-frame identifier ahead of the uplink sub-frame as the sub-frame used for transmitting the TPC command to the UE.

In another embodiment, the selection unit includes a parameter unit and a second determination unit.

The parameter unit is configured to obtain an identifier of the uplink sub-frame when the sub-frame mapping is represented as a mapping relationship between the uplink sub-frame identifier and a value of a delay of TPC controlling, and determine the value of the delay of TPC controlling corresponding to the identifier of the uplink sub-frame according to the mapping relationship.

The second determination unit is configured to determine a downlink sub-frame ahead of the uplink sub-frame by a time interval of a size of the determined value of the delay of TPC controlling as the sub-frame used for transmitting the TPC command to the UE.

The User Equipment 31 includes an information unit, a sub-frame unit, an instruction unit and a power unit.

The information unit is configured to determine the current uplink and downlink sub-frame allocation mode used for data transmission before transmitting data using the uplink sub-frame, and obtain a sub-frame mapping corresponding to the uplink and downlink sub-frame allocation mode.

The sub-frame unit is configured to determine the downlink sub-frame used for transmitting the TPC command corresponding to the uplink sub-frame according to the sub-frame mapping.

The instruction unit is configured to obtain the TPC command received through the determined downlink sub-frame.

The power unit is configured to determine the power for data transmission via the uplink sub-frame according to the TPC command.

In an embodiment, the sub-frame unit includes a first obtaining unit and a first result unit.

The first obtaining unit is configured to obtain an identifier of the uplink sub-frame when the sub-frame mapping is represented as the mapping relationship between the uplink sub-frame identifier and the downlink sub-frame identifier, and determine a downlink sub-frame identifier corresponding to the identifier of the uplink sub-frame according to the mapping relationship.

The first result unit is configured to determine a downlink sub-frame corresponding to the determined downlink sub-frame identifier ahead of the uplink sub-frame as the sub-frame used for transmitting the TPC command corresponding to the uplink sub-frame.

In another embodiment, the sub-frame unit includes a second obtaining unit and a second result unit.

The second obtaining unit is configured to obtain an identifier of the uplink sub-frame when the sub-frame mapping is represented as a mapping relationship between the uplink sub-frame identifier and a value of a delay of TPC controlling, and determine the value of the delay of TPC controlling corresponding to the identifier of the uplink sub-frame according to the mapping relationship.

The second result unit is configured to determine a downlink sub-frame ahead of the uplink sub-frame by a time interval of a size of the determined value of the delay of TPC controlling as the sub-frame used for transmitting the TPC command corresponding to the uplink sub-frame.

Figure 4:
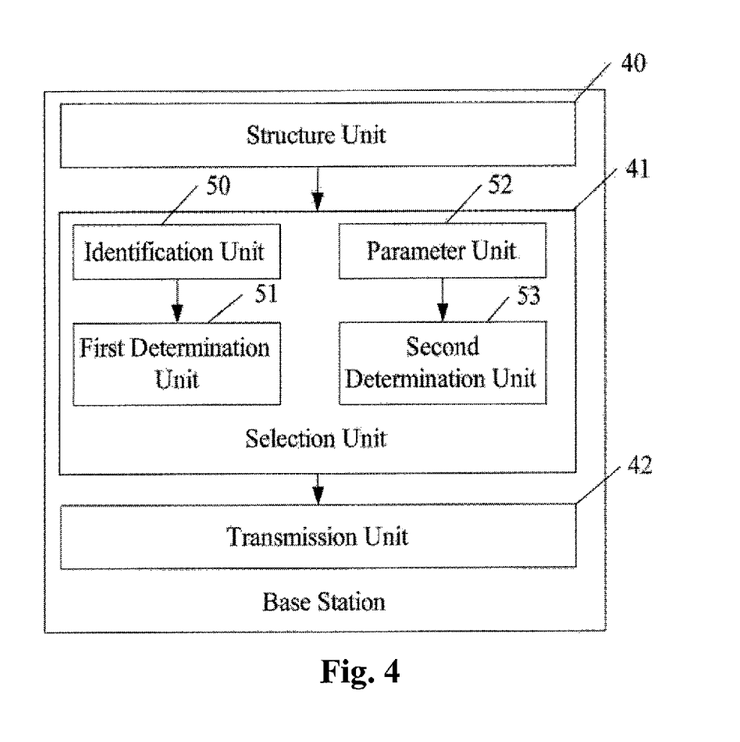
FIG. 4 is a schematic diagram showing the structure of a base station according to an embodiment of the invention.

As shown in FIG. 4, an embodiment of the invention further provides a base station, which is applicable to a Time Division Duplex data transmission system and includes a structure unit 40, a selection unit 41 and a transmission unit 42.

The structure unit 40 is configured to determine the current uplink and downlink sub-frame allocation mode used for data transmission, and obtain a sub-frame mapping corresponding to the uplink and downlink sub-frame allocation mode.

The selection unit 41 is configured to select a downlink sub-frame used for transmitting the TPC command to the UE according to the sub-frame mapping.

The transmission unit 42 is configured to transmit the TPC command to the UE using the selected downlink sub-frame.

In an embodiment, the selection unit 41 includes an identification unit 50 and a first determination unit 51.

The identification unit 50 is configured to obtain an identifier of the uplink sub-frame when the sub-frame mapping is represented as the mapping relationship between the uplink sub-frame identifier and the downlink sub-frame identifier, and determine a downlink sub-frame identifier corresponding to the identifier of the uplink sub-frame according to the mapping relationship.

The first determination unit 51 is configured to determine a downlink sub-frame corresponding to the determined downlink sub-frame identifier ahead of the uplink sub-frame as the sub-frame used for transmitting the TPC command to the UE.

In another embodiment, the selection unit 41 includes a parameter unit 52 and a second determination unit 53.

The parameter unit 52 is configured to obtain an identifier of the uplink sub-frame when the sub-frame mapping is represented as a mapping relationship between the uplink sub-frame identifier and a value of a delay of TPC controlling, and determine the value of the delay of TPC controlling corresponding to the identifier of the uplink sub-frame according to the mapping relationship.

The second determination unit 53 is configured to determine a downlink sub-frame ahead of the uplink sub-frame by a time interval of a size of the determined value of the delay of TPC controlling as the sub-frame used for transmitting the TPC command to the UE.

Figure 5:
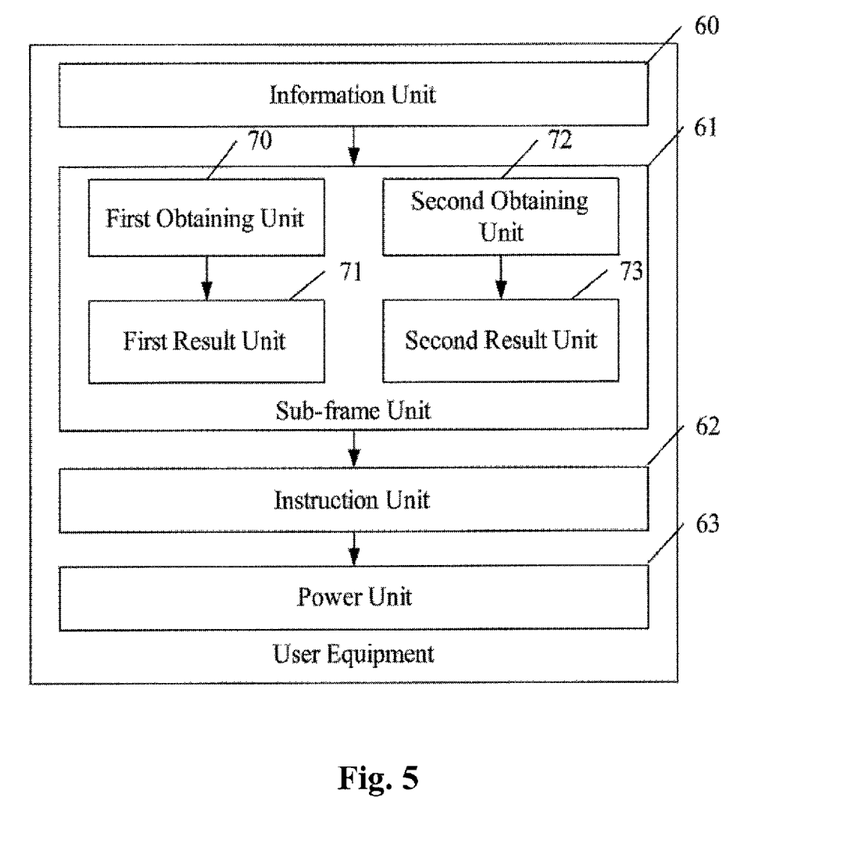
FIG. 5 is a schematic diagram showing the structure of a User Equipment according to an embodiment of the invention.

As shown in FIG. 5, an embodiment of the invention further provides a User Equipment, which is applicable to a Time Division Duplex data transmission system and includes an information unit 60, a sub-frame unit 61, an instruction unit 62 and a power unit 63.

The information unit 60 is configured to determine the current uplink and downlink The sub-frame unit 61 is configured to determine the downlink sub-frame used for transmitting the TPC command corresponding to the uplink sub-frame according to the sub-frame mapping.

The instruction unit 62 is configured to obtain the TPC command received through the determined downlink sub-frame.

The power unit 63 is configured to determine the power for data transmission via the uplink sub-frame according to the TPC command.

In an embodiment, the sub-frame unit 61 includes a first obtaining unit 70 and a first result unit 71.

The first obtaining unit 70 is configured to obtain an identifier of the uplink sub-frame when the sub-frame mapping is represented as the mapping relationship between the uplink sub-frame identifier and the downlink sub-frame identifier, and determine a downlink sub-frame identifier corresponding to the identifier of the uplink sub-frame according to the mapping relationship.

The first result unit 71 is configured to determine a downlink sub-frame corresponding to the determined downlink sub-frame identifier ahead of the uplink sub-frame as the sub-frame used for transmitting the TPC command corresponding to the uplink sub-frame.

In another embodiment, the sub-frame unit 61 includes a second obtaining unit 72 and a second result unit 73.

The second obtaining unit 72 is configured to obtain an identifier of the uplink sub-frame when the sub-frame mapping is represented as a mapping relationship between the uplink sub-frame identifier and a value of a delay of TPC controlling, and determine the value of the delay of TPC controlling corresponding to the identifier of the uplink sub-frame according to the mapping relationship.

The second result unit 73 is configured to determine a downlink sub-frame ahead of the uplink sub-frame by a time interval of a size of the determined value of the delay of TPC controlling as the sub-frame used for transmitting the TPC command corresponding to the uplink sub-frame.

In the solutions of the embodiments of the present invention, the base station selects a downlink sub-frame for transmitting the TPC command according to the configured sub-frame. mapping, and the UE obtains the TPC command received through the corresponding downlink sub-frame according to the configured sub-frame mapping and determines the transmission power according to the TPC command. As a result, the TPC command can be transmitted and received according to the sub-frame mapping in the LTE TDD system, thus enabling proper and effective uplink power control.

It will be appreciated that various modifications and alternations may be made on the present invention by those skilled in the art without departing from the scope of the invention. All the modifications and alternations of the invention falling within the scope of the enclosed claims and equivalents thereof are intended to be included in the scope of the invention.

The invention claimed is:

1. A method for determining uplink transmission power in a Time Division Duplex system, comprising:
    determining, by a User Equipment, a current uplink and downlink sub-frame allocation mode before transmitting data using an uplink sub-frame, obtaining a sub-frame mapping corresponding to the uplink and downlink sub-frame allocation mode, determining a downlink sub-frame used by a base station for transmitting a Transmission Power Control, TPC, command corresponding to the uplink sub-frame according to the sub-frame mapping, obtaining the TPC command received through the determined downlink sub-frame, and determining power for data transmission via the uplink sub-frame according to the TPC command; wherein, the TPC command corresponding to the uplink sub-frame is transmitted by the base station through the downlink sub-frame after the base station determines the current uplink and downlink sub-frame allocation mode, obtains the sub-frame mapping corresponding to the uplink and downlink sub-frame allocation mode, and determines the downlink sub-frame used for transmitting the TPC command corresponding to the uplink sub-frame according to the sub-frame mapping;
    wherein the sub-frame mapping comprises a mapping relationship between an uplink sub-frame and a downlink sub-frame to be used for transmitting a TPC command corresponding to the uplink sub-frame; and
    if the mapping relationship between an uplink sub-frame and a downlink sub-frame to be used for transmitting a TPC command corresponding to the uplink sub-frame is a mapping relationship between an identifier of the uplink sub-frame and an identifier of the downlink sub-frame, then determining the downlink sub-frame used for transmitting the TPC command corresponding to the uplink sub-frame according to the sub-frame mapping comprises:
        obtaining an identifier of the uplink sub-frame, determining a downlink sub-frame identifier corresponding to the identifier of the uplink sub-frame according to the mapping relationship, and determining a downlink sub-frame corresponding to the downlink sub-frame identifier ahead of the uplink sub-frame as the downlink sub-frame used for transmitting the TPC command.

2. The method of claim 1, wherein,
    if the mapping relationship between an uplink sub-frame and a downlink sub-frame to be used for transmitting a TPC command corresponding to the uplink sub-frame is a mapping relationship between an identifier of the uplink sub-frame and a value of a delay of TPC controlling the size of which is a time interval between the uplink sub-frame and the downlink sub-frame, then determining the downlink sub-frame used for transmitting the TPC command corresponding to the uplink sub-frame according to the sub-frame mapping comprises:
        obtaining an identifier of the uplink sub-frame, determining a value of the delay of TPC controlling corresponding to the identifier of the uplink sub-frame according to the mapping relationship, and determining a downlink sub-frame ahead of the uplink sub-frame by a time interval of a size of the deteimined value of the delay of TPC controlling as the downlink sub-frame used for transmitting the TPC command.

3. The method of claim 2, wherein if a delay caused by the processing of the downlink control signaling by the User Equipment is 3 ms, the mapping relationship between the identifier of the uplink sub-frame and the value of the delay of TPC controlling lies in that:
    if an uplink and downlink sub-frame allocation mode 0 is employed, the value of the delay of TPC controlling corresponding to an uplink sub-frame 2 is 6 or 7, the value of the delay of TPC controlling corresponding to an uplink sub-frame 3 is 7, the value of the delay of TPC controlling corresponding to an uplink sub-frame 4 is 4, the value of the delay of TPC controlling corresponding to an uplink sub-frame 7 is 6 or 7, the value of the delay of TPC controlling corresponding to an uplink sub-frame 8 is 7, and the value of the delay of TPC controlling corresponding to an uplink sub-frame 9 is 4;
    if an uplink and downlink sub-frame allocation mode 1 is employed, the value of the delay of TPC controlling corresponding to the uplink sub-frame 2 is 6, the value of the delay of TPC controlling corresponding to the uplink sub-frame 3 is 4, the value of the delay of TPC controlling corresponding to the uplink sub-frame 7 is 6, and the value of the delay of TPC controlling corresponding to the uplink sub-frame 8 is 4;
    if an uplink and downlink sub-frame allocation mode 2 is employed, the value of the delay of TPC controlling corresponding to the uplink sub-frame 2 is 4, and the value of the delay of TPC controlling corresponding to the uplink sub-frame 7 is 4;
    if an uplink and downlink sub-frame allocation mode 3 is employed, the value of the delay of TPC controlling corresponding to the uplink sub-frame 2 is 4, the value of the delay of TPC controlling corresponding to the uplink sub-frame 3 is 4, and value of the delay of TPC controlling corresponding to the uplink sub-frame 4 is 4;
    if an uplink and downlink sub-frame allocation mode 4 is employed, the value of the delay of TPC controlling corresponding to the uplink sub-frame 2 is 4, and the value of the delay of TPC controlling corresponding to the uplink sub-frame 3 is 4;

if an uplink and downlink sub-frame allocation mode 5 is employed, the value of the delay of TPC controlling corresponding to the uplink sub-frame 2 is 4; and if an uplink and downlink sub-frame allocation mode 6 is employed, the value of the delay of TPC controlling corresponding to the uplink sub-frame 2 is 7, the value of the delay of TPC controlling corresponding to the uplink sub-frame 3 is 7, the value of the delay of TPC controlling corresponding to the uplink sub-frame 4 is 5, the value of the delay of TPC controlling corresponding to the uplink sub-frame 7 is 7, and the value of the delay of TPC controlling corresponding to the uplink sub-frame 8 is 7.

4. The method of claim 3, wherein when the uplink and downlink sub-frame allocation mode 0 is employed, if the uplink sub-frame 2 is a first one of two continuous uplink sub-frames subjected to multiple frame schedule, the value of the TPC downlink controlled delay parameter corresponding to the uplink sub-frame 2 is 6, otherwise, the value of the TPC downlink controlled delay parameter corresponding to the uplink sub-frame 2 is 7; and if the uplink sub-frame 7 is a first one of two continuous uplink' sub-frames subjected to multiple frame schedule, the value of the TPC downlink controlled delay parameter corresponding to the uplink sub-frame 7 is 6, otherwise, the value of the TPC downlink controlled delay parameter corresponding to the uplink sub-frame 7 is 7.

5. The method of claim 2, wherein, the mapping relationship between the identifier of the uplink sub-frame and the value of the delay of TPC controlling is:
   a one-to-one mapping relationship and/or a one-to-multiple mapping relationship.

6. The method of claim 1, wherein,
   the mapping relationship between the identifier of the uplink sub-frame and the identifier of the downlink sub-frame is any one of:
      a one-to-one mapping relationship, a one-to-multiple mapping relationship and a multiple-to-one mapping relationship.

7. The method of claim 1, wherein if a delay caused by the processing of the downlink control signaling by the User Equipment is 3 ms, the mapping relationship between the identifier of the uplink sub-frame and the identifier of the downlink sub-frame lies in that:
   if an uplink and downlink sub-frame allocation mode 0 is employed, an uplink sub-frame 2 corresponds to a downlink sub-frame 5 or a special sub-frame 6, an uplink sub-frame 3 corresponds to a special sub-frame 6, an uplink sub-frame 4 corresponds to a downlink sub-frame 0, an uplink sub-frame 7 corresponds to the downlink sub-frame 0 or a special sub-frame 1, an uplink sub-frame 8 corresponds to the special sub-frame 1, and an uplink sub-frame 9 corresponds to the downlink sub-frame 5;

if an uplink and downlink sub-frame allocation mode 1 is employed, the uplink sub-frame 2 corresponds to the special sub-frame 6, the uplink sub-frame 3 corresponds to the downlink sub-frame 9, the uplink sub-frame 7 corresponds to the special sub-frame 1, and the uplink sub-frame 8 corresponds to the downlink sub-frame 4;

if an uplink and downlink sub-frame allocation mode 2 is employed, the uplink sub-frame 2 corresponds to the downlink sub-frame 8, and the uplink sub-frame 7 corresponds to the downlink sub-frame 3;

if an uplink and downlink sub-frame allocation mode 3 is employed, the uplink sub-frame 2 corresponds to the downlink sub-frame 8, the uplink sub-frame 3 corresponds to the downlink sub-frame 9, and the uplink sub-frame 4 corresponds to the downlink sub-frame 0;

if an uplink and downlink sub-frame allocation mode 4 is employed, the uplink sub-frame 2 corresponds to the downlink sub-frame 8, and the uplink sub-frame 3 corresponds to the downlink sub-frame 9;

if an uplink and downlink sub-frame allocation mode 5 is employed, the uplink sub-frame 2 corresponds to the downlink sub-frame 8; and if an uplink and downlink sub-frame allocation mode 6 is employed, the uplink sub-frame 2 corresponds to the downlink sub-frame 5, the uplink sub-frame 3 corresponds to the special sub-frame 6, the uplink sub-frame 4 corresponds to the downlink sub-frame 9, the uplink sub-frame 7 corresponds to the downlink sub-frame 0, and the uplink sub-frame 8 corresponds to the special sub-frame 1.

8. The method of claim 7, wherein when the uplink and downlink sub-frame allocation mode 0 is employed, if the uplink sub-frame 2 is a second one of two continuous uplink sub-frames subjected to multiple frame schedule, the uplink sub-frame 2 corresponds to the downlink sub-frame 5, otherwise, the uplink sub-frame 2 corresponds to the special sub-frame 6; and if the uplink sub-frame 7 is a second one of two continuous uplink sub-frames subjected to the multiple frame schedule, the uplink sub-frame 7 corresponds to the downlink sub-frame 0, otherwise, the uplink sub-frame 7 corresponds to the special sub-frame 1.

9. The method of claim 1, wherein, a time interval between the uplink sub-frame and the downlink sub-frame determined according to the sub-frame mapping is more than or equal to a delay caused by the processing of the downlink control signaling by the User Equipment.

* * * * *